(12) United States Patent
Chou

(10) Patent No.: US 6,851,540 B2
(45) Date of Patent: Feb. 8, 2005

US006851540B2

(54) PAPER CURRENCY COLLECTION DETECTION ARRANGEMENT FOR AN AUTOMATIC VENDING MACHINE

(75) Inventor: Shang Ter Chou, Taoyuan (TW)

(73) Assignee: International Currency Technologies Corporation, Taipei (TW)

( * ) Notice: Subject to any disclaimer, the term of this patent is extended or adjusted under 35 U.S.C. 154(b) by 583 days.

(21) Appl. No.: 10/015,268

(22) Filed: Dec. 17, 2001

(65) Prior Publication Data

US 2003/0126022 A1 Jul. 3, 2003

(51) Int. Cl.$^7$ .................................................. G07F 7/04
(52) U.S. Cl. ...................... 194/206; 194/207; 271/219; 271/220
(58) Field of Search .............................. 194/206, 207; 271/219, 220

(56) References Cited

U.S. PATENT DOCUMENTS

| | | | | |
|---|---|---|---|---|
| 4,540,081 A | * | 9/1985 | Mori et al. ................. | 194/207 |
| 4,809,966 A | * | 3/1989 | Kobayashi et al. ......... | 271/181 |
| 4,809,967 A | * | 3/1989 | Kondo ........................ | 271/181 |
| 5,421,443 A | * | 6/1995 | Hatamachi et al. ......... | 194/206 |
| 5,533,605 A | * | 7/1996 | Mays et al. ................. | 194/206 |
| 5,632,367 A | * | 5/1997 | Bergeron et al. ........... | 194/207 |
| 5,641,157 A | * | 6/1997 | Mays et al. ................. | 271/181 |
| 5,657,846 A | * | 8/1997 | Schwartz .................... | 194/206 |
| 5,715,923 A | * | 2/1998 | Dekker et al. .............. | 194/206 |
| 5,756,985 A | * | 5/1998 | Holste et al. ................ | 235/475 |
| 5,887,695 A | * | 3/1999 | Hatamachi et al. ......... | 194/207 |
| 2002/0056960 A1 | * | 5/2002 | Bergeron et al. ........... | 271/145 |
| 2003/0137095 A1 | * | 7/2003 | Ito et al. ..................... | 271/176 |

FOREIGN PATENT DOCUMENTS

| EP | 0531983 A1 | * | 3/1993 |
| EP | 0564001 A1 | * | 10/1993 |

* cited by examiner

Primary Examiner—Steven B. McAllister

(57) ABSTRACT

A paper currency collection detection arrangement used in an automatic vending machine formed of a paper currency receiving unit, a paper currency collection cabinet, and a detection unit. The paper currency collection cabinet has a bottom sensor hole, and a slide moved to close/open the sensor hole subject to the amount of paper currency collected. The detection unit has a sensor controlled to emit signal to the sensor hole and adapted for cutting off power supply when the slide does not block the sensor hole.

4 Claims, 11 Drawing Sheets

US 6,851,540 B2

PAPER CURRENCY COLLECTION DETECTION ARRANGEMENT FOR AN AUTOMATIC VENDING MACHINE

BACKGROUND OF THE INVENTION

1. Field of the Invention

The present invention relates to an automatic vending machine and, more specifically to a paper currency collection detection arrangement for an automatic vending machine, which automatically cuts off power supply when the amount of collected paper currency reached a predetermined high level.

2. Description of the Related Art

A variety of automatic vending machines have been disclosed for use to sell different consumer goods. Some automatic vending machines accept coins only. Some other automatic vending machines accept paper currency. An automatic vending machine accepting paper currency generally has means to detect the collection of paper currency and to cut off power supply when collected paper currency is full. According to conventional designs, counter means, photoelectric switch means, and micro-switch means are commonly used to detect the collection of paper currency. However, these conventional designs have drawbacks. The use of counter means greatly complicates the circuit design, and its maintenance work is also complicated. The use of photoelectric switch means greatly increases the installation cost. Further, the detection face of photoelectric switch means tends to be covered with dust, resulting in a false action. The use of micro-switch means is not durable. A contact error tends to occur after a long use of micro-switch means. There is also known still another design that uses a solenoid switch and a magnetic device to detect the collection of received paper currency. During operation of the automatic vending machine, the functioning of the solenoid switch tends to be interfered with external noises from surrounding metal members and electronic elements. Further, the magnetic force of the solenoid switch and the magnetic device may deteriorate after a long use, resulting in a low sensitivity.

SUMMARY OF THE INVENTION

The present invention has been accomplished to provide a paper currency collection detection arrangement, which eliminates the aforesaid drawbacks. It is one object of the present invention to provide a paper currency collection detection arrangement, which detects the full collection of paper currency accurately. It is another object of the present invention to provide a paper currency collection detection arrangement, which is durable in use. To achieve these and other objects of the present invention, the paper currency collection detection arrangement comprises a paper currency receiving unit, a paper currency collection cabinet, and a detection unit. The paper currency collection cabinet has a bottom sensor hole, and a slide moved to close/open the sensor hole subject to the amount of paper currency collected. The detection unit has a top sensor hole aimed at the bottom sensor hole of the paper currency collection cabinet, and a sensor mounted on the inside and controlled to emit signal to the top sensor hole of the detection unit and the bottom sensor hole, and adapted for cutting off power supply when the slide does not block the sensor hole. Because the sensor is mounted inside the detection unit and kept from sight, it is well protected against dust.

DETAILED DESCRIPTION OF THE PREFERRED EMBODIMENT

Figure 1:
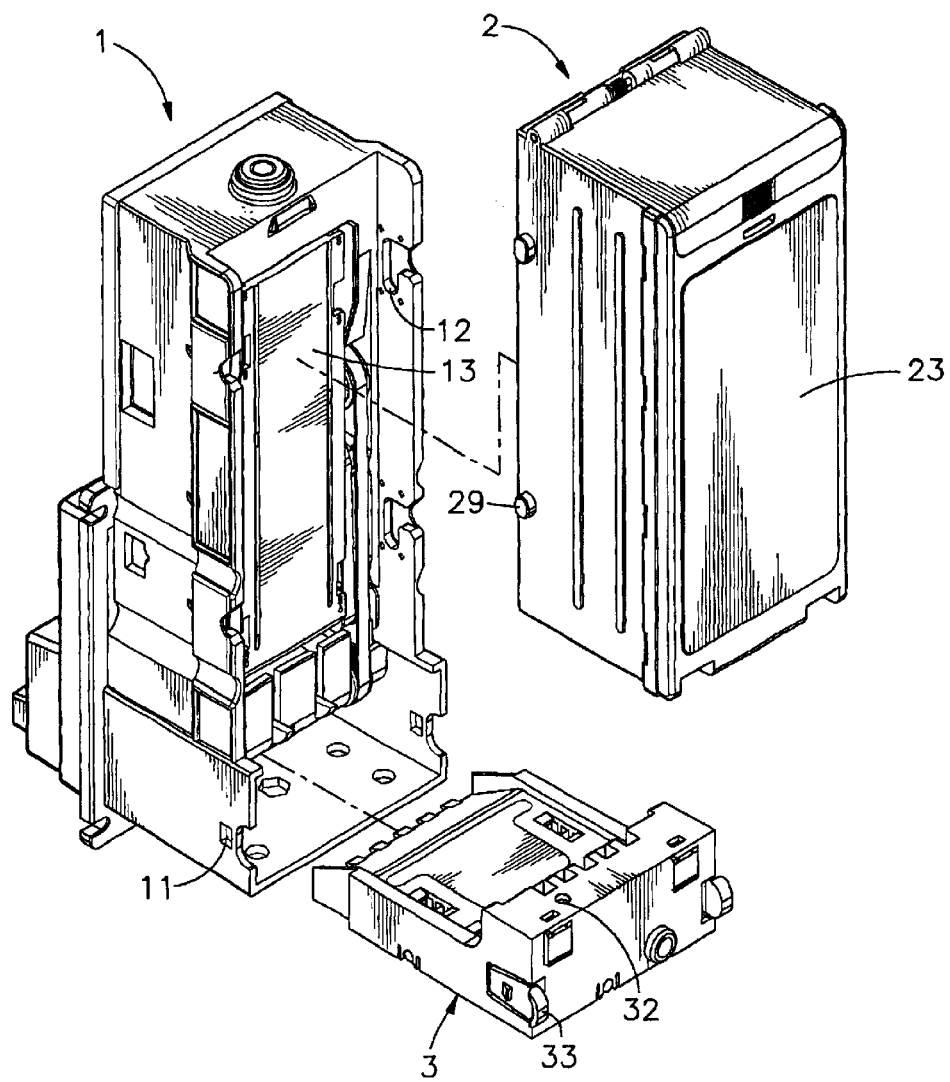
FIG. 1 is an exploded view of the preferred embodiment of the present invention.
Figure 2:
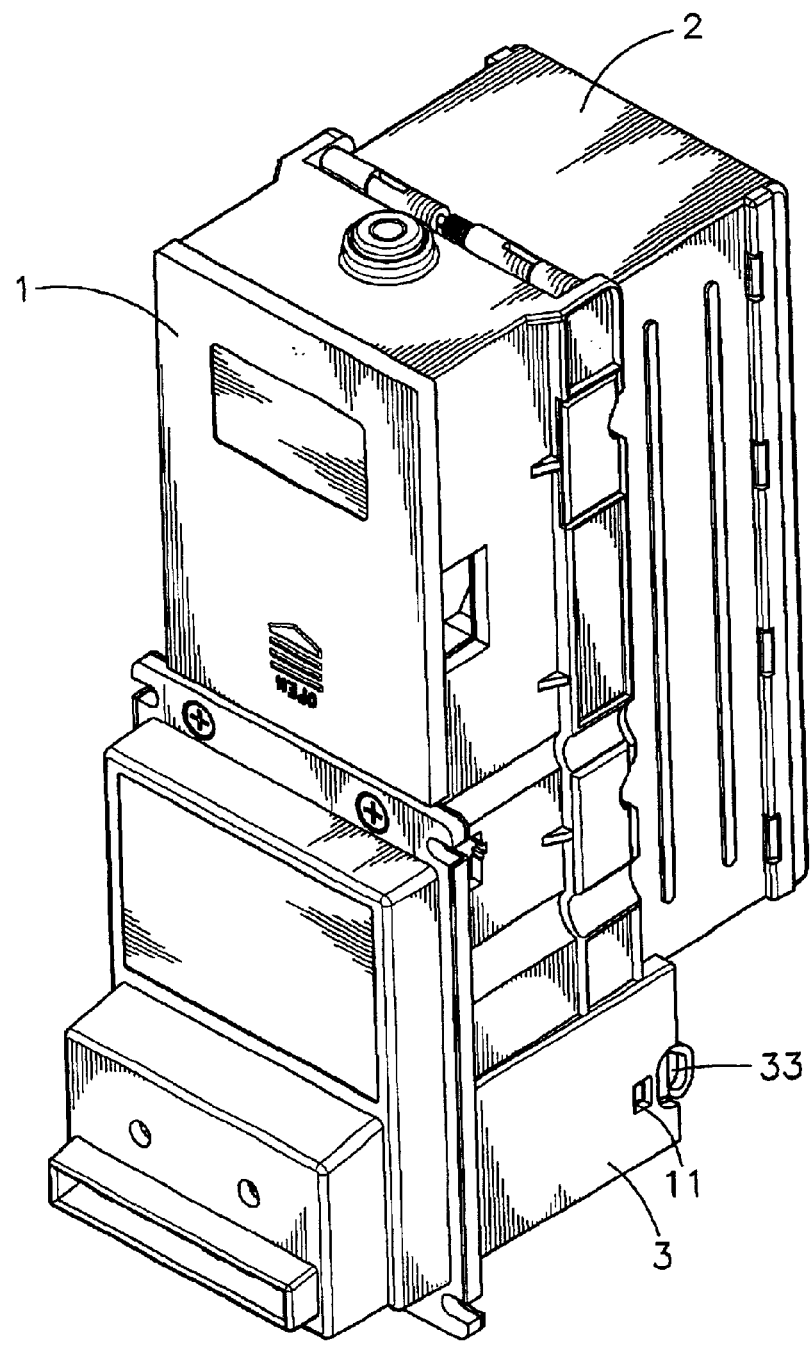
FIG. 2 is an elevational assembly view of the preferred embodiment of the present invention.

Referring to FIGS. 1 and 2, a paper currency collection detection arrangement in accordance with the present invention is generally comprised of a paper currency receiving unit 1 adapted for receiving paper currency inserted therein, a paper currency collection cabinet 2 adapted for collecting received paper currency, and a detection unit 3 adapted for verifying the authenticity of received paper currency.

Figure 10:
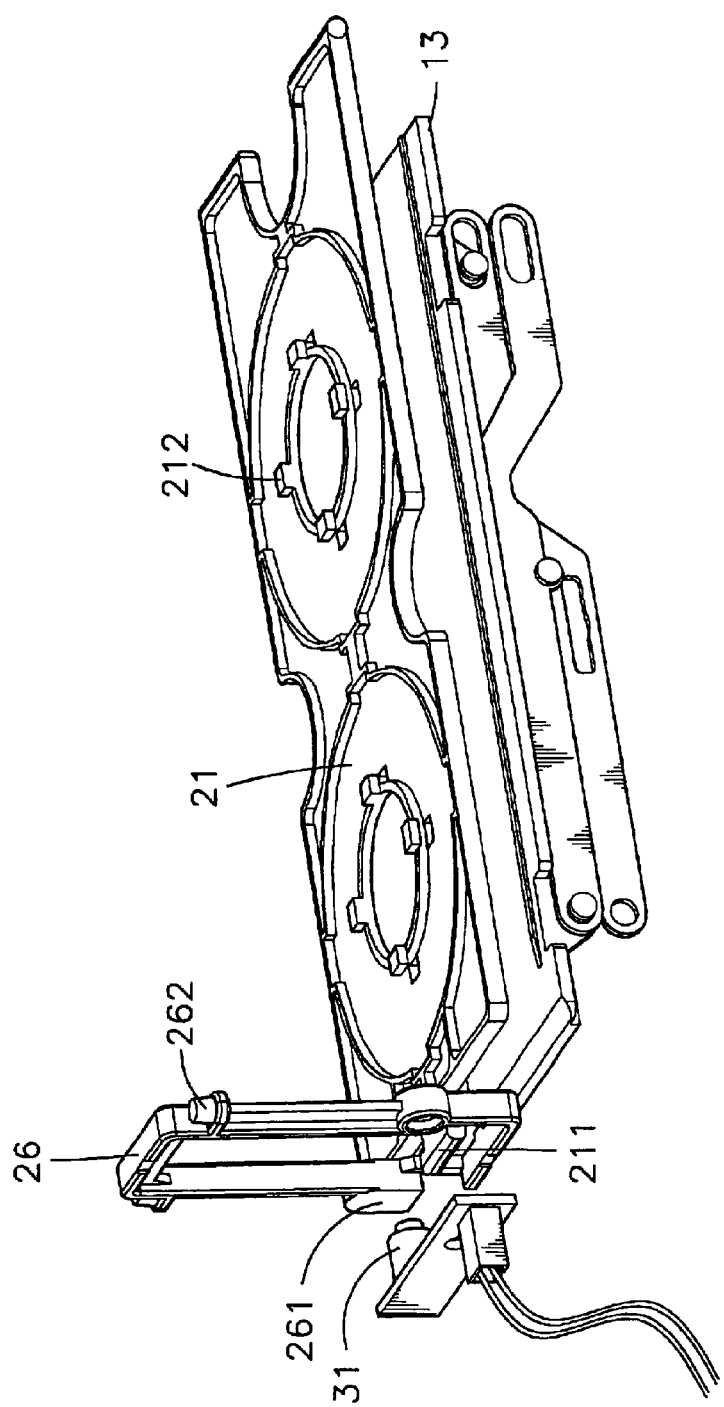
FIG. 10 is an elevational view of a part of the present invention showing the relative positioning of the paper currency holding down mechanism, the slide, the pressure board, and the sensor.
Figure 11:
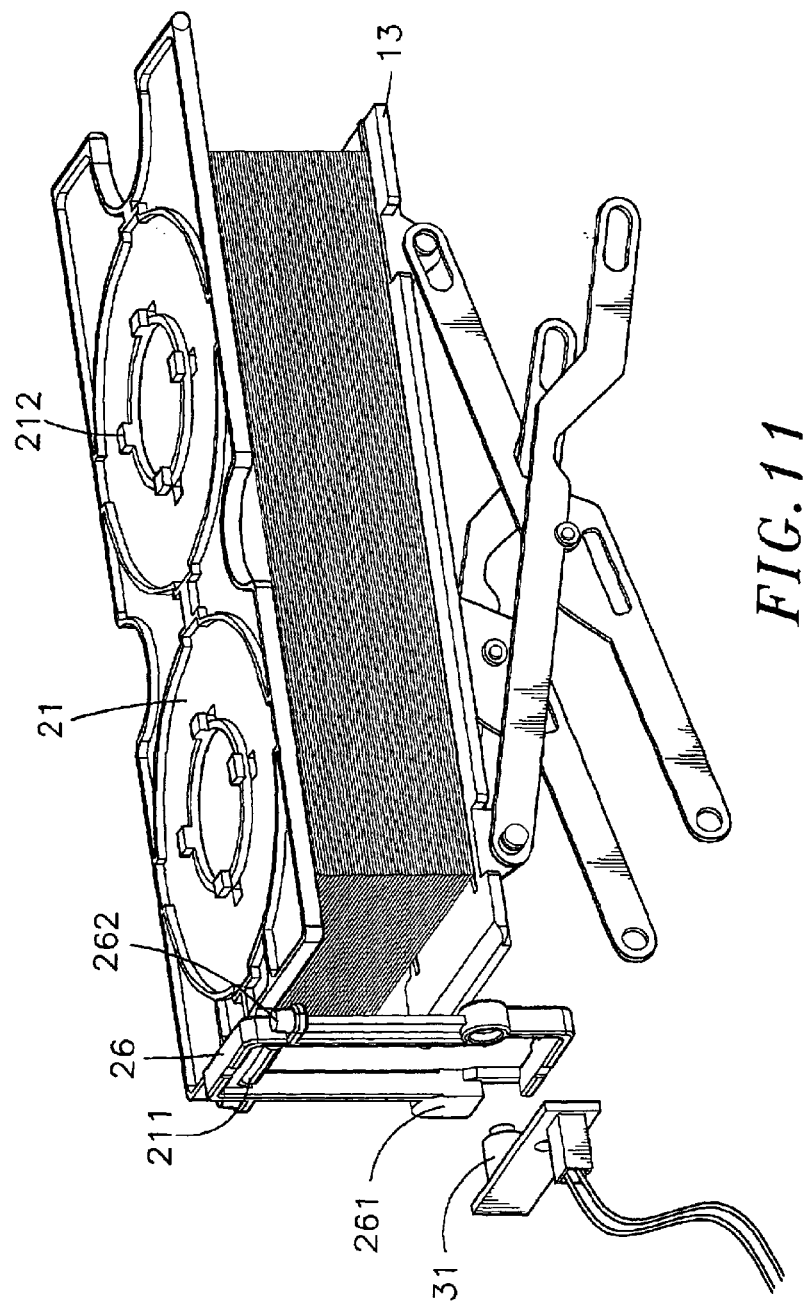
FIG. 11 is similar to FIG. 10 but showing a stack of paper currency retained between the paper currency holding down mechanism, the slide and the pressure board, the slide moved with the pressure board relative to the sensor.

The paper currency receiving unit 1 comprises a paper currency transferring mechanism (not shown), a paper currency holding down mechanism 13 (see FIGS. 10 and 11), two retaining holes 11 bilaterally disposed at the back side near the bottom, and pairs of L-shaped coupling holes 12 symmetrically disposed at the back side at different elevations above the retaining holes 11.

Figure 3:
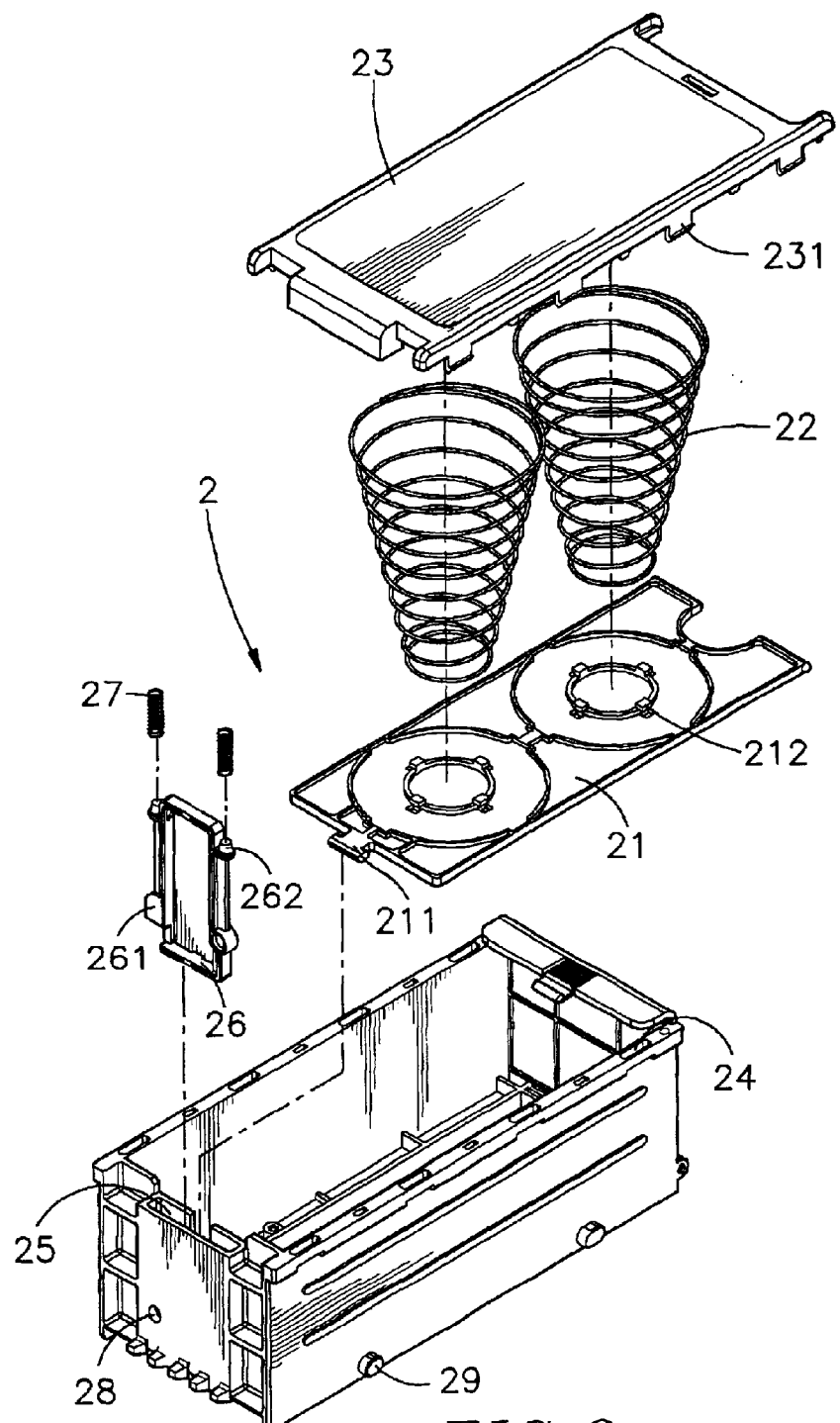
FIG. 3 is an exploded view of the paper currency collection cabinet according to the present invention.
Figure 4:
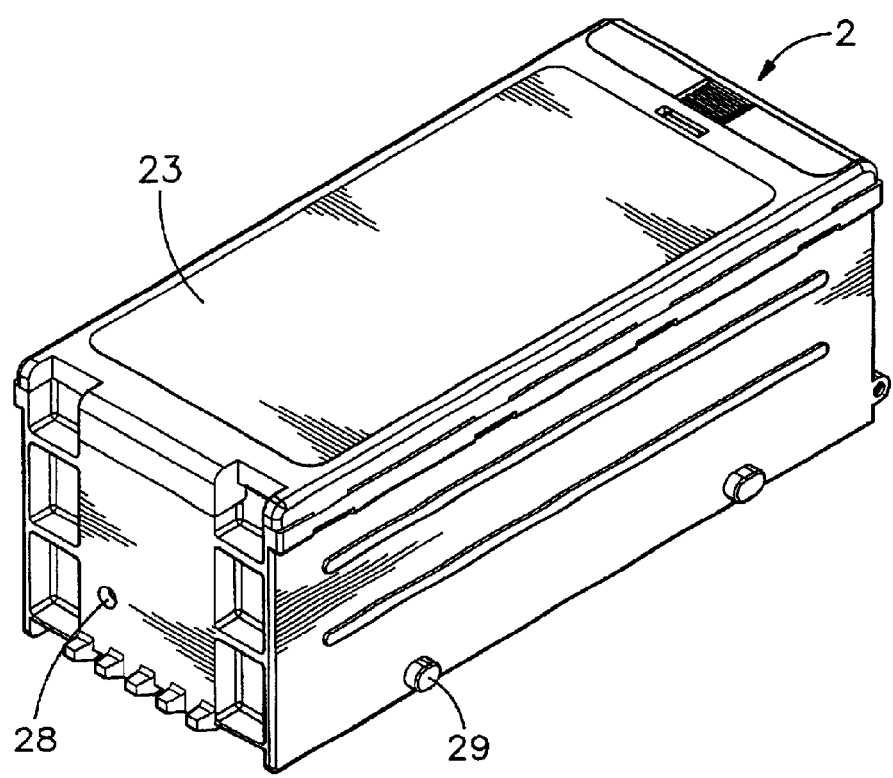
FIG. 4 is an elevational view of the paper currency collection cabinet according to the present invention.

Referring to FIGS. 3 and 4, the paper currency collection cabinet 2 comprises a cover plate 23 detachably covered on the front open side thereof. The cover plate 23 has peripheral hooks 231 respectively hooked in respective hook holes 25 around the front open side of the paper currency collection cabinet 2. A pressure board 21 is suspended in the paper currency collection cabinet 2. Two spring members 22 are supported between the cover plate 23 and the pressure board 21 to force the pressure board 21 away from the cover plate 23 toward the back side of the paper currency collection cabinet 2. The pressure board 21 has a push rod 211 protruded from one side, and two coupling portions 212 respectively coupled to the spring members, for example, spiral springs 22. The paper currency collection cabinet 2 further comprises a plurality of coupling rods 29 symmetrically disposed at two opposite lateral sides thereof and respectively coupled to the L-shaped coupling holes 12 of the paper currency receiving unit 1, a bottom track 25, a slide 26 inserted into the bottom track 25, and a bottom detection hole 28. The slide 26 comprises a side block 261, and two locating rods 262 bilaterally disposed near one end. Further, two small spring members 27 are respectively connected between the locating rods 262 of the slide 26 and the inside wall of the cover plate 23.

Figure 5:
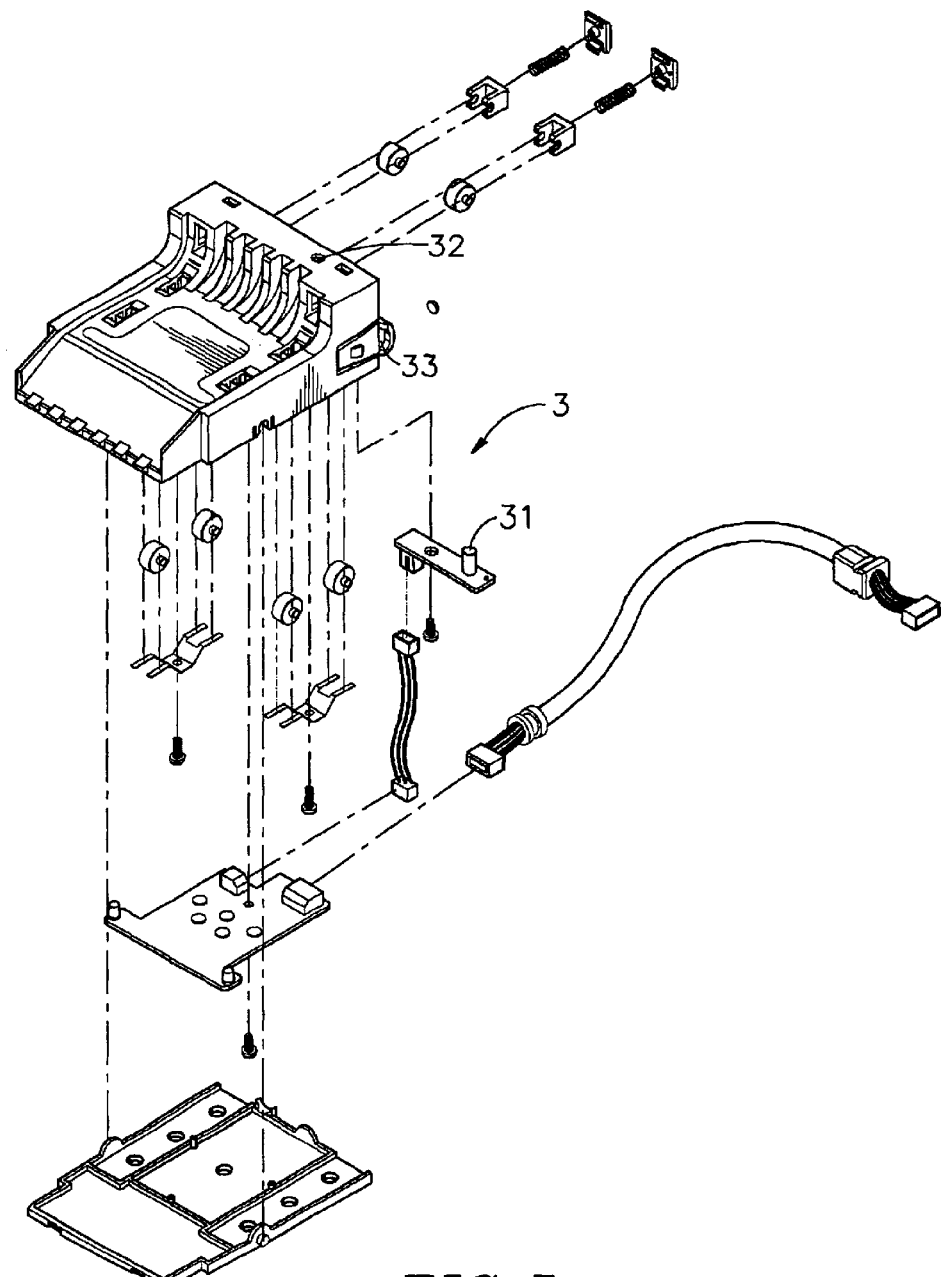
FIG. 5 is an exploded view of the detection unit according to the present invention.
Figure 6:
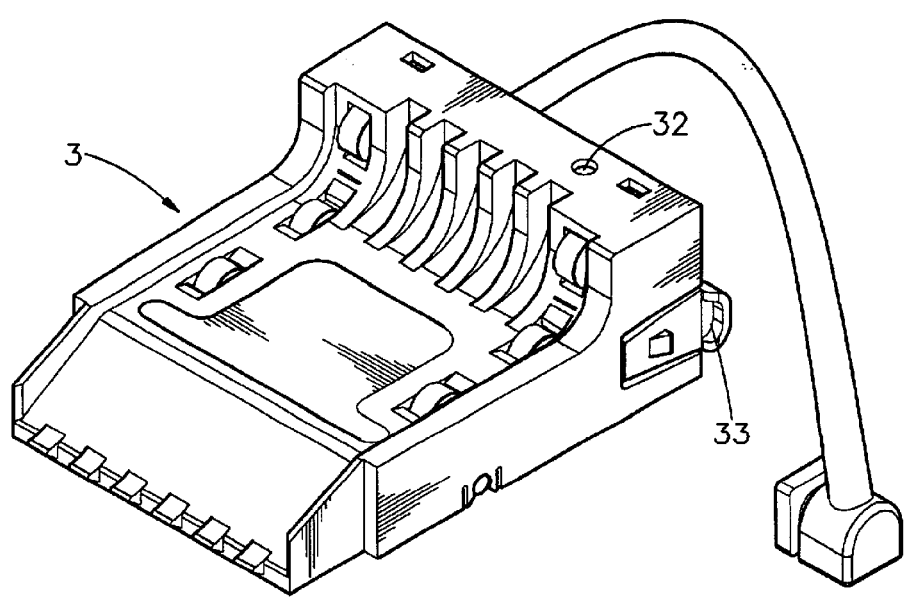
FIG. 6 is an elevational view of the detection unit according to the present invention.
Figure 7:
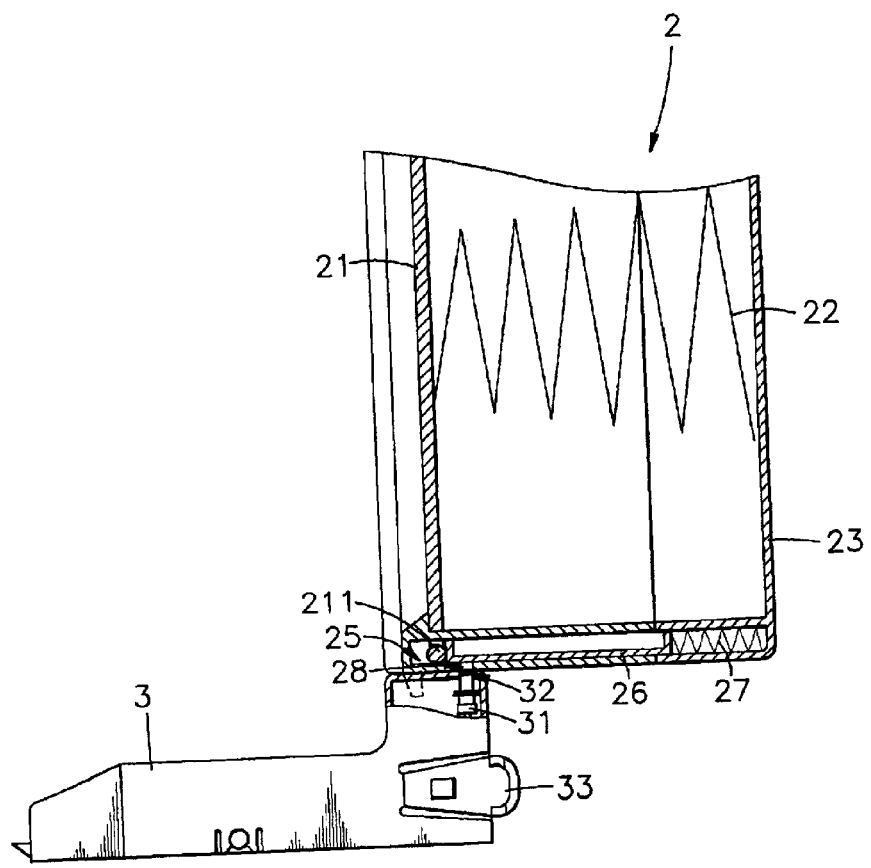
FIG. 7 is a sectional view of a part of the present invention showing the top sensor hole of the detection unit aimed at the bottom sensor hole of the paper currency collection cabinet, the paper currency collection cabinet empty.
Figure 8:
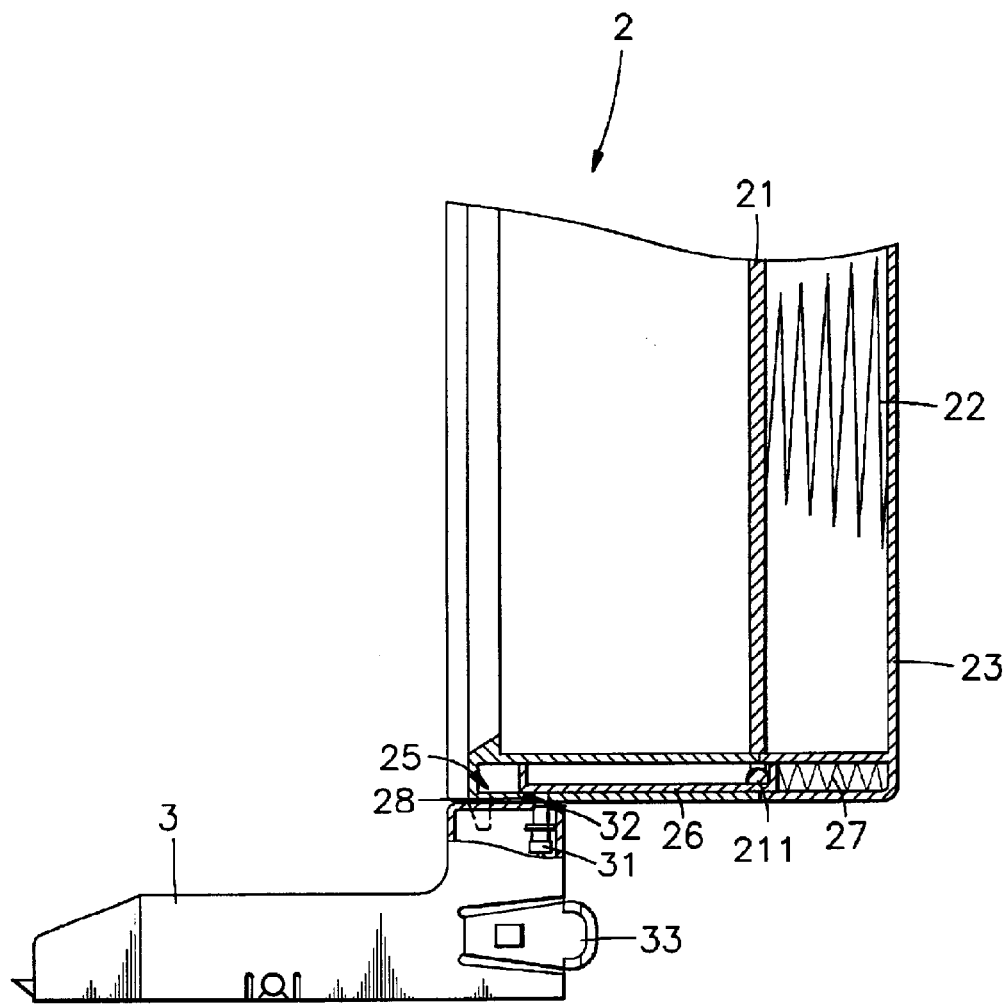
FIG. 8 is similar to FIG. 7 but showing a certain amount of paper currency collected in the paper currency collection cabinet.
Figure 9:
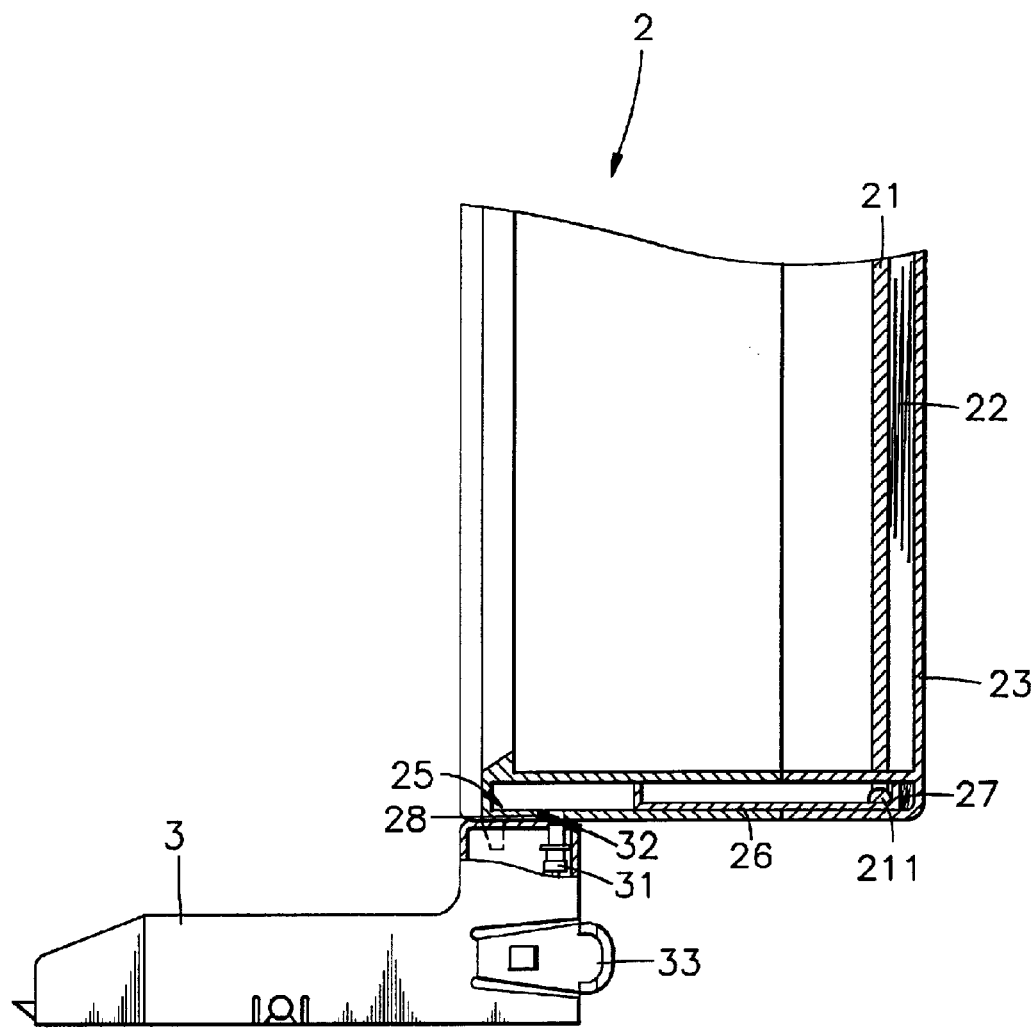
FIG. 9 is similar to FIG. 8 but showing the full amount of collected paper currency in the paper currency collection cabinet, the slide moved away from the bottom sensor hole of the paper currency collection cabinet.

Referring to FIGS. 5 and 6, the detection unit 3 comprises a top detection hole 32 corresponding to the bottom detection hole 28 of the paper currency collection cabinet 2, a sensor 31 formed of a transmitting circuit and a receiving circuit (not shown) disposed on the inside and aimed at the top detection hole 32, and two retainers 33 disposed at two opposite lateral sides and adapted for engaging the retaining holes 11 of the paper currency receiving unit 1 to secure the detection unit 3 to the paper currency receiving unit 1.

During installation, the coupling rods 29 of the paper currency collection cabinet 2 are respectively coupled to the L-shaped coupling holes 12 of the paper currency receiving unit 1, keeping the paper currency collection cabinet 2 secured to the back side of the paper currency receiving unit 1, and then the detection unit 3 is inserted into the paper currency receiving unit 1 below the paper currency collection cabinet 2 to force the retainers 33 into engagement with the retaining holes 11 (see FIGS. 1 and 2 again).

Referring to FIGS. from 7 through 11, the transmitting circuit of the sensor 31 emits signal through the top sensor hole 32 of the detection unit 3 and the bottom sensor hole 28 of the paper currency collection cabinet 2. When the paper currency receiving unit 1 received a piece of paper currency, the paper currency holding down mechanism 13 holds down the received piece of paper currency on the pressure board 21 against the spring members 22. If the collected paper currency in the paper currency collection cabinet 2 is not full, the side block 261 of the slide 26 is maintained covered on the bottom sensor hole 28 of the paper currency collection cabinet 2 to reflect the signal emitted from the transmitting circuit of the sensor 31, and the receiving circuit of the sensor 31 receives the reflected signal. Following the increasing amount of collected paper currency, the push rod 211 of the pressure board 21 is forced by the pressure from the holding down mechanism 13 to move the slide 26 forwards toward the cover plate 23 against the small spring members 27. When the amount of collected paper currency reaches a predetermined high level, the side block 261 is moved with the slide 26 away from the bottom sensor hole 28 of the paper currency collection cabinet 2. At this time, the receiving circuit of the sensor 31 receives no signal; thereby causing the sensor 31 to produce a signal to cut off the power circuit and to turns on an external warning lamp (not shown). In order to save the cost, a reflective photoelectric switch can be used for the sensor 31. Because the sensor 31 is installed in the detection unit 3, it is well protected against dust. Because only one sensor 31 is used, the cost is low. Further, because the slide 26 is supported on the small spring members 27 and moved in the track 25 following the amount of pressure from the paper currency holding down mechanism 13 of the paper currency receiving unit 1, the detection action of the present invention is accurate.

A prototype of paper currency collection detection arrangement has been constructed with the features of the annexed drawings of FIGS. 1~11. The paper currency collection detection arrangement functions smoothly to provide all of the features discussed earlier.

Although a particular embodiment of the invention has been described in detail for purposes of illustration, various modifications and enhancements may be made without departing from the spirit and scope of the invention. Accordingly, the invention is not to be limited except as by the appended claims.

What the invention claimed is:

1. A paper currency collection detection arrangement used in an automatic vending machine and adapted for detecting the amount of collected paper currency and controlling a power supply subject to the detection, comprising a paper currency receiving unit adapted for receiving paper currency, said paper currency receiving unit comprising a paper currency holding down mechanism adapted for holding received paper currency and push said receiving paper currency backwards to a paper currency collection cabinet and a paper currency collection cabinet being fastened to said paper currency receiving unit and adapted for collecting said received paper currency, said paper currency collection cabinet comprising a back open side aimed at the paper currency holding down mechanism of said paper currency receiving unit, a front cover, a pressure board moved between said back open side and said front cover and adapted for supporting said received paper currency against said paper currency holding down mechanism, and a plurality of spring members supported between said front cover and said pressure board, and a detection unit installed in said paper currency receiving unit below said paper currency collection cabinet and adapted for verifying the authenticity of said received paper currency, wherein:

said paper currency collection cabinet comprises a bottom panel, a bottom track on the inside at said bottom panel, a sensor hole through said bottom panel, a spring-supported slide inserted into said bottom track and moveable upon contact with said pressure board to close or open said sensor hole;

said detection unit comprises a sensor means controlled to emit a signal to said sensor hole and adapted for cutting off said power supply when said slide does not block said sensor hole.

2. The paper currency collection detection arrangement as claimed in claim 1, wherein the spring members supported between said front cover and said pressure board are spiral springs.

3. The paper currency collection detection arrangement as claimed in claim 1, wherein said paper currency receiving unit comprises a plurality of coupling holes bilaterally disposed at a back side thereof; said paper currency collection cabinet comprises a plurality of coupling rods symmetrically disposed at two opposite lateral sides thereof and respectively coupled to the coupling holes of said paper currency receiving unit.

4. The paper currency collection detection arrangement as claimed in claim 3, wherein said coupling holes of said paper currency receiving unit are L-shaped holes.

* * * * *